United States Patent [19]
Tillotson et al.

[11] Patent Number: 5,275,796
[45] Date of Patent: Jan. 4, 1994

[54] METHOD FOR PRODUCING METAL OXIDE AEROGELS HAVING DENSITIES LESS THAN 0.02 G/CC

[75] Inventors: Thomas M. Tillotson, Tracy; John F. Poco, Livermore; Lawrence W. Hrubesh, Pleasanton; Ian M. Thomas, Livermore, all of Calif.

[73] Assignee: Regents of the University of California, Oakland, Calif.

[21] Appl. No.: 754,349

[22] Filed: Sep. 5, 1991

Related U.S. Application Data

[63] Continuation of Ser. No. 571,061, Aug. 23, 1990, abandoned.

[51] Int. Cl.[5] .................. C01B 33/12; B01J 21/00
[52] U.S. Cl. .................. 423/338; 502/233; 252/315.01; 252/315.6
[58] Field of Search .................. 423/335, 338; 106/287.34; 501/12; 502/233, 252, 315.01, 315.5, 315.6, 315.7; 252/315.01, 315.5, 315.6, 315.7

[56] References Cited

U.S. PATENT DOCUMENTS

| | | | |
|---|---|---|---|
| 4,610,863 | 9/1986 | Tewari et al. | 423/338 |
| 4,717,708 | 1/1988 | Cheng et al. | 502/233 |
| 4,806,328 | 2/1989 | Van Lierop et al. | 423/338 |
| 4,810,674 | 3/1989 | Che et al. | 501/12 |
| 4,911,903 | 3/1990 | Unger et al. | 423/338 |

FOREIGN PATENT DOCUMENTS 0366197 2/1990 European Pat. Off. ............ 423/338

OTHER PUBLICATIONS

S. A. Steward et al., "Silica Aerogel Process Optimization", UCRL-101606 Abst, Abst. of Presentation at Meeting on Scientific Computing and Automation, Philadelphia, Pa. (Oct. 10-13, 1989).

T. M. Tillotson et al., "Partially Hydrolyzed Alkoxysilanes as Precursors for Silica Aerogels", UCRL-9734 Ext Abs, Materials Research Soc., Pittsburgh, Pa. (Apr. 1988), pp. 685-689.

L. W. Hrubesh, "Development of Low Density Silica Aerogel as a Capture Media for Hyper-Velocity Particles", UCRL-21234, Summary Report FY 1989, NASA-Jet Propulsion Lab., Pasadena, Calif. 91109 (Oct. 1989).

*Primary Examiner*—Olik Chaudhuri
*Assistant Examiner*—Ken Horton
*Attorney, Agent, or Firm*—Daryl S. Grzybicki; Henry P. Sartorio

[57] ABSTRACT

A two-step method is described for making transparent aerogels which have a density of less than 0.003 g/cm$^3$ to those with a density of more than 0.8 g/cm$^3$, by a sol/gel process and supercritical extraction. Condensed metal oxide intermediate made with purified reagents can be diluted to produce stable aerogels with a density of less than 0.02 g/cm$^3$. High temperature, direct supercritical extraction of the liquid phase of the gel produces hydrophobic aerogels which are stable at atmospheric moisture conditions. Monolithic, homogeneous silica aerogels with a density of less than 0.02 to higher than 0.8 g/cm$^3$, with high thermal insulation capacity, improved mechanical strength and good optical transparency, are described.

14 Claims, 6 Drawing Sheets

METHOD FOR PRODUCING METAL OXIDE AEROGELS HAVING DENSITIES LESS THAN 0.02 G/CC

The U.S. Government has rights in this invention pursuant to Contract No. W-7405-ENG-48 between the U.S. Department of Energy and the University of California, for the operation of Lawrence Livermore National Laboratory.

This is a continuation of application Ser. No. 07/571,061, filed Aug. 23, 1990, now abandoned.

FIELD OF INVENTION

The subject invention relates generally to metal oxide aerogel porous glasses, and to a process for making them. More particularly, it relates to the preparation of transparent monolithic silica aerogels having densities in the range of less than 0.003 g/cm$^3$ through 0.8 g/cm$^3$, which have improved qualities of transparency, thermal insulative capacity, and strength, than conventional aerogels.

BACKGROUND OF THE INVENTION

The first aerogels, made in the the 1930's by S. S. Kistler (Nature 127: 741 (1931)) and disclosed in U.S. Pat. No. 2,249,767 were translucent pieces of porous silica glass which were prepared by formation of silica 'hydrogels' that were initially exchanged with alcohol, then dried with little shrinkage. When alcohol was supercritically extracted from the wet gel under pressure and at high temperature, the aerogel produced had a density of about 0.05 g/cm$^3$, or a porosity as high as 98 percent. However, Kistler's process was time consuming and laborious and subsequent advances in the art, have reduced the processing time and increased the quality of the aerogels produced.

The high porosity silica aerogels first made were scientific curiosities and were not used in practical applications. Recently, in the 1970's, the high porosity aerogels were used as part of detectors for charged particles in high-energy physics experiments. The aerogels have a thermal conductivity which is about 100 times less than conventional, non-porous silica glass. The high transparency of silica aerogels, combined with their excellent insulating properties, suggest that aerogels could serve as superinsulating window materials. Other practical applications for silica aerogels include use as insulation in refrigerators, boilers, or as passive solar collectors.

Sound transmission through aerogels is slower than through air and their acoustic impedance is intermediate between that of most sound transducers and air. This suggests that aerogels could be used to improve the efficiency of such transducers in applications such as micro-speakers and distance ranging. The unique properties of aerogels make them useful for a variety of applications which require transparency, low thermal conductivity and strength with very low weight.

An improvement over Kistler's method was described by Teichner et al., in U.S. Pat. No. 3,672,833, where a silicon alkoxide such as tetraethoxysilane (TEOS) or tetramethoxysilane (TMOS), in an aliphatic alcohol solvent, was hydrolysed by one to five times the stoichiometric quantity of water, in a single mixing step. This single-step sol-gel process involves the hydrolysis reaction of silicon alkoxide compounds with water in either an acid, neutral, or basic medium, followed by the condensation reactions in which the hydrolysis products polymerize to form a gel. In this method, the wet gel already contains alcohol solvent as a result of the reactions, and therefore does not require the slow process of exchanging solvents before drying by supercritical extraction, as does Kistler's method. Also, the alcohol can be directly removed from the wet gel at high temperatures and pressures required for its supercritical extraction. These are the conditions necessary to re-esterify the aerogel surfaces which makes the material hydrophobic in character and stable toward variations when exposed to atmospheric moisture (E. C. Broge, U.S. Pat. No. 2,680,696). The silica aerogels made by this process have improved properties of transparency and strength, over those produced from Kistler's method. However, the silica aerogels produced by the method of the instant invention can be made in a much extended range of densities and have substantially improved physical properties.

In a commercial process, exemplified by that which is described by S. Henning and L. Svensson (Phys. Scripta 23: 698 (1982) and U.S. Pat. No. 4,402,927 by von Dardel et al.)), tetramethoxysilane (TMOS) was reacted with water in the presence of basic catalyst (NH$_4$OH), in a single mixing step, according to the following reactions:

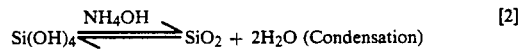

The condensation reaction immediately follows the hydrolysis in the same reaction vessel.

The microstructure of the aerogel made by this process is composed of spherical primary particles linked together to form chains which are themselves linked to form a continuous matrix of silica, surrounded by the reaction solvent, alcohol. The reaction rates of the hydrolysis and condensation steps strongly depend on the pH through the influence of the catalyst and these rates ultimately determine the microstructure of the gel (R. K. Iler, *The Chemistry of Silica* (Wiley Interscience, New York, 1979) and D. W. Schaefer, Science 243:1023 (1989)). Conventional silica aerogel glasses have distinguishable microstructures which are characteristic of the particular reaction process used for their formation.

Conventional silica aerogels, made by the "single-step" hydrolysis/condensation reactions given above in equations [1] and [2], have a bulk density in the range of 0.05 to 0.27 g/cm$^3$. Stoichiometric and miscibility considerations limit monolithic aerogels attainable to a maximum density of near 0.3 g/cm$^3$. Lower densities are achieved by dilution of the initial reactants with additional alcohol. However, the higher the dilution, the longer the time that is required for gelation to occur. Also, at some maximum dilution level, the reverse equilibrium reactions [Eq.1] will inhibit gelation, thereby setting the ultimate density limit for low density aerogels.

Aerogels are generally transparent, however, when aerogels are prepared by conventional "single-step" method, there is a loss in the clarity of those aerogels which have a density less than 0.04 g/cm$^3$. It is believed that the loss of transparency in the low density aerogels is produced by light scattering from pores in the aerogel which have diameters greater than 100 nm.

Tewari et al., in U.S. Pat. No. 4,610,863, "Process for Forming Transparent Aerogel Insulating Arrays", described an improved process for making silica aerogels wherein alcohol that was generated in a "single-step" hydrolysis/condensation reaction of silicon alkoxide to form an "alcogel", was removed by substitution with liquid $CO_2$ and subsequent supercritical drying of the alcogel to remove the $CO_2$ Tewari suggested that substitution of $CO_2$ for the alcohol solvent would allow removal of solvent at less severe conditions of temperature and pressure.

The "single-step" process described by Tewari et al., produced aerogels containing 5% silica, which would have a density of about 0.11 $g/cm^3$. The chemistry of the "single-step" method, which Tewari et al., used to make the alcogel, limits the highest attainable density of an aerogel to be about 0.3 $g/cm^3$ and it limits the lowest attainable density of an aerogel to about 0.02 $g/cm^3$. These density limitations exist even with their described method of substitution and extraction of solvent Supercritical extraction of $CO_2$ solvent following exchange with alcohol as described by Tewari et al., however, produces an aerogel with hydrophilic surfaces. Hygroscopic attraction of moisture to the surfaces of the aerogel leads to instability and eventually to collapse of the aerogel structure, if it is exposed to atmospheric moisture.

It is known in the art that the microstructure, and therefore, the properties of the dried aerogel are determined by its precursor chemistry. It is also known that the precursor chemistry is controllable through the use of catalysts to adjust the pH of the reacting solutions, through the amount of water used in the reactions, and by the reaction sequence. For example, single-step base catalysed hydrolysis/condensation of silicon alkoxide leads to a colloidal particle gel, whereas, single-step acid catalysed hydrolysis/condensation leads to polymeric gels. The importance of the reaction sequence was demonstrated by Brinker et al., (J. Non-Cryst. Sol. 48:47 (1982)) wherein a two-step process was described for making silica gels from which high density "xerogels" resulted after evaporative drying. The first step of the Brinker process involved the acid catalysed hydrolysis of silicon alkoxide using a sub-stoichiometric amount of water required to fully hydrolyse the silicon alkoxide. This first step produces a partially hydrolysed, partially condensed silica in alcohol solution, in which the presence of the alcohol limits continued condensation by affecting the reverse equilibrium reactions. The sol from this step could be characterized as consisting of clusters of polymeric silica chains. The second step involved the base catalysed completion of the hydrolysis/condensation reaction where the condensation continues until gelation occurs. The microstructure of the final gel made from this two-step process was more highly crosslinked and generally stronger than that of a single-step process gel.

Schaefer et al., (*Physics and Chemistry of Porous Media II.* J. R. Banavar, J. Koplik and K. W. Winkler, Eds. AIP New York (1987) pp. 63-80) described a modified two-step process in which the alcohol that is generated by the reactions of the first step was removed from the reaction by distillation, leaving a partially condensed silica intermediate. The intermediate was dissolved with another alcohol, before completing the hydrolysis/condensation with base catalyst. The alcohol in the product gel was then supercritically extracted, producing aerogel. The microstructure of the aerogel resulting from this two-step process was polymeric as in the single-step hydrolysis/condensation reactions. Neither of these references recognized the adverse effects of the alcohol solvent on the hydrolysis/condensation reactions which are due to the re-esterification of the hydrolysed species in the presence of excess alcohol. The presence of alcohol in the reactions affect both the rates and the degree of polymerization of the condensing gel, and thus affect its morphology. The presence of the alcohol also limits the gelation process to preclude the formation of very low density aerogels (i.e. densities less than 0.02 $g/cm^3$).

SUMMARY OF THE INVENTION

Accordingly, it is an object of the present invention to provide transparent, porous metal oxide aerogels which have densities over an extended range from less than 0.003 $g/cm^3$ through 0.8 $g/cm^3$.

A further object is to provide transparent, porous silica glass, aerogels, which have densities over an extended range from less than 0.003 $g/cm^3$ through than 0.8 $g/cm^3$.

Another object is to provide a method for the production of moisture stable, transparent, porous metal oxide aerogels which have a density in a range of less than about 0.003 $g/cm^3$ through 0.8 $g/cm^3$.

A further object is to provide a method for the production of moisture stable, transparent, porous silica glass, aerogels, which have a density in a range of less than about 0.003 $g/cm^3$ through 0.8 $g/cm^3$.

Another object is to provide a process for making porous metal oxide aerogels of selected density in the range from less than 0.003 $g/cm^3$ through 0.8 $g/cm^3$, comprising the steps of:

a. mixing purified metal alkoxide with a substoichiometric amount of water in an alcohol solvent;

b. reacting the metal alkoxide with a selected amount of an acid catalyst to produce an oligomeric mixture of partially condensed metal oxide intermediate;

c. removing all reaction-generated alcohol and solvent alcohol;

d. adding purified non-alcoholic solvent to the condensed metal oxide intermediate;

e. reacting non-alcoholic solvated condensed metal oxide intermediate with a sufficient amount of water to complete the hydrolysis, and a selected amount of base catalyst;

f. pouring base-catalyzed condensed metal oxide intermediate into molds to form a gel; and g. extracting the liquid solvent from the gel to form an aerogel.

A further object is to provide a process for making porous silica glass of selected density in the range from less than 0.003 $g/cm^3$ through 0.8 $g/cm^3$, comprising the steps described above for hydrolysis/condensation of metal alkoxides.

The instant invention describes stable, transparent, hydrophobic silica aerogels having densities in the range from less than 0.003 $g/cm^3$ through 0.8 $g/cm^3$, and a method for making them. The method requires the use of purified starting materials, use of selected amounts of acid catalyst to make a condensed silica intermediate, removal and replacement of alcohol solvent with non-alcoholic solvent, completion of the hydrolysis of the condensed silica material using base catalyst, casting of the solvated condensed silica intermediate into molds to form a wet gel, followed by the removal of the solvent from the wet gel.

This method can be used to produce an aerogel of any desired density in the range from less than 0.003 g/cm³ through 0.8 g/cm³, by using a "two-step" hydrolysis/-condensation process. The two steps refer to a hydrolysis of the reagents with a partial condensation, followed by an exchange of solvents and further completion of the hydrolysis/condensation reactions.

The invention is based upon the recognition that the presence of excess alcohol in the sol and gel limits the ultimate density range of the gels which can be formed. The method to make especially low density aerogels requires removal of both solvent and reaction-generated alcohol which arises during the formation of a condensed silica intermediate, followed by dilution of the condensed silica intermediate with a non-alcoholic solvent, to produce a gel in which the structural integrity is not damaged by the drying process. Direct supercritical extraction of the residual and diluting solvents, involving temperature and pressure greater than the critical point of the reaction-generated alcohol, yields an aerogel which is hydrophobic and is less susceptible to damage by exposure to atmospheric moisture. If aerogel structures are produced by prior art methods, such as Tewari et al., following critical extraction of a substituted solvent, such as $CO_2$, which has a critical temperature less than that of alcohol, the surface character of the gel is hygroscopic and must be sealed to prevent uptake of moisture. Silica aerogels prepared by the instant invention, which have a density of less than 0.04 g/cm³, are formed by dilution of condensed silica intermediate. They will gel in a short time, less than 72 hours, as compared to a time of several weeks which is required for gels made by the "single-step" method.

Aerogels of higher densities are obtained by using less non-alcoholic solvent diluent when using the condensed silica intermediate as a precursor for a gel. The condensed silica intermediate is mixed with water, a selected amount of non-alcoholic diluent, and a selected amount of base catalyst. The mixture is allowed to gel at ambient temperature. The alcogel formed is then subjected to either direct supercritical extraction of the solvent within the gel pores or supercritical extraction of an exchanged solvent.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The accompanying drawings, which are incorporated and form a part of the specification, illustrate an embodiment of the invention and, together with the description, serve to explain the principles of the invention.

DESCRIPTION OF THE INVENTION

Figure 1:
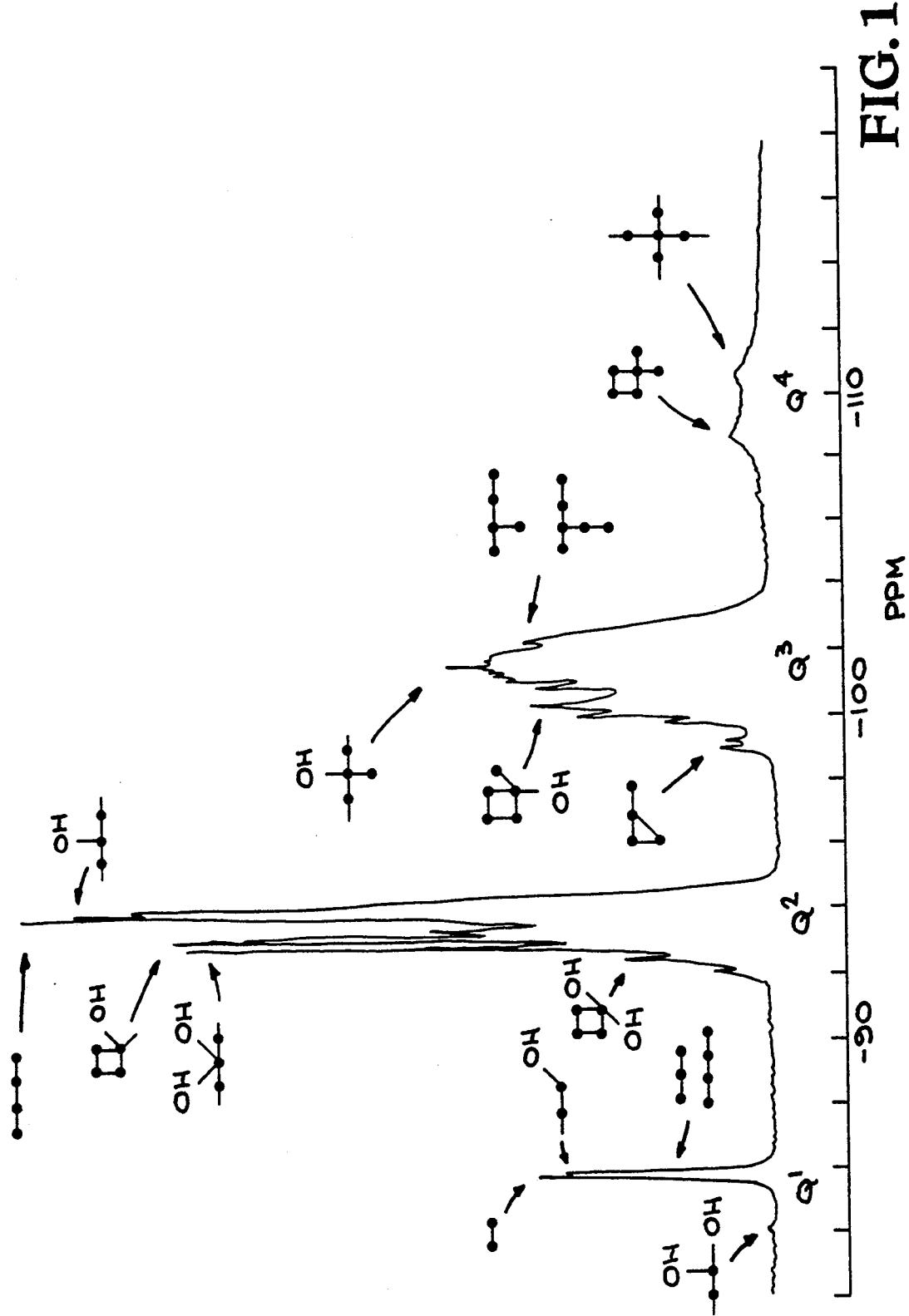
FIG. 1. $^{29}Si$ Nuclear Magnetic Resonance (NMR) spectrum of the condensed silica intermediate produced as described in Example 1.

The subject invention is a stable, transparent, porous glass (aerogel), with a density in the range of less than 0.003 g/cm³ through 0.8 g/cm³, which can be made only by specific selection of the reagents and processing steps as described herein. The method described enables the formation of an aerogel with a unique microstructure which produces materials that are among the lightest of man-made materials, with increased transparency, increased thermal insulation character and greater strength per density than conventional aerogels. Using these procedures, transparent silica aerogel monoliths, as large as 5 cm in diameter by 40 cm in length, have been produced which have bulk densities as low as 0.003 g/cm³ and as high as 0.8 g/cm³, and at many densities and sizes between these extremes. The method described is scalable to larger product sizes.

While the descriptions and examples offered in support of this application refer to silica aerogels made from silicon alkoxide precursors, other metal oxide aerogels, having a similar range of densities, as well as improved properties, may be produced utilizing the methods of the instant invention. Other metal oxides which may be used to produce metal oxide aerogels according to the instant method include, but are not limited to oxides of germanium, tantalum, zirconium, boron, titanium and aluminum, made from metal alkoxides including but not limited to $Ge(OC_2H_5)_4$, $Ta(OC_3H_7)_4$, $Zr(OC_3H_7)_4$, $B(OCH_3)_5$, $Ti(OC_2H_5)_4$ and Al (sec. butoxide)$_3$. The following descriptions will refer to silicon alkoxide chemistry as a preferred embodiment of this invention, wherein silicon alkoxide is the metal alkoxide used to produce a silica aerogel of desired density. Conventional methods of hydrolysis/condensation used to make aerogels from silicon alkoxides have also been used in production of aerogels from other metal alkoxides by Teichner et al., in Advances in Colloid and Interface Science 5:245-273(1976).

A relatively high purity silica can be formed when high purity precursor materials, TMOS, water and alcohol, are used. The formed gel is of high purity silica, with hydroxyl groups bound to each non-siloxane bonded surface silicon atom, and surrounded by some alcohol, some added diluent solvent, and some residual water.

The density range of conventional aerogels described in the earlier references (e.g. Teichner et al., U.S. Pat. No. 3,672,833; von Dardel et al., U.S. Pat. No. 4,402,927; and Zarzycki et al., U.S. Pat. No. 4,432,956) is about 0.04 g/cm³ to about 0.3 g/cm³. By using a multi-step process that initially involves the formation of a partially hydrolysed, partially condensed polysilicate mixture (i.e. condensed silica intermediate), aerogels can be produced with densities which extend beyond these limits. The condensed silica intermediate herein described may be used to form aerogels of any selected density between about 0.003 and about 0.8 grams per cubic centimeter. The dilution of the condensed silica product intermediate by a selected volume of compatible solvent controls the ultimate density of the gel and thus that of the aerogel. Because the intermediate is already partially condensed, it gels relatively rapidly even at high dilutions. In conventional, "single-step" aerogel formation, the gelation resulting from the stoichiometric hydrolysis of the alkoxysilane compound is ultimately limited by the reverse equilibrium reactions which occur when silicon alkoxide solutions are diluted excessively with alcohol. Also, low density aerogels formed by the "single step" method, especially those having lower density, have limited transparency due to more efficient scatter of light from the larger pores formed in the aerogel.

The disclosed method for rapidly producing stable, transparent aerogels, uses a two-step process in which very low impurity silica alkoxide precursor, water and alcohol solvent are mixed and reacted with controlled amounts of acid catalyst to make a condensed silica intermediate. The alcohol, both the added solvent and reaction-generated, is removed from the partially condensed silica intermediate, by distillation or other means. The condensed silica intermediate may be used directly, or with little dilution, to make high density aerogels. For lower density aerogels, the condensed silica intermediate is diluted with an ultra-purified non-alcoholic solvent and further mixed with a selected amount of base catalyst. The selection of a non-alcoholic solvent is made with the recognition that the presence of the alcohol becomes limiting to the molecular construction of the gel when silica components are very dilute. The amount of catalyst selected determines the rate of gel formation and can also affect its strength and density.

The disclosed method for producing aerogels, was developed with further recognition that low density aerogel structure and surface is best preserved and stabilized against the effects of moisture during direct removal of the solvents under supercritical conditions whereby the surface hydroxyl groups are esterified. The direct removal of the solvent produces an aerogel with a hydrophobic surface character. The direct supercritical extraction of the solvents does not require a late step replacement of solvents after gel formation is complete and therefore conserves time to obtain the finished product. Replacement of the solvent after aerogel formation, such as is done in the prior art methods, causes reduced stability of the fine structural form of the low density aerogel when exposed to moisture of the atmosphere and it is especially detrimental in the low density aerogels.

Preparation of Aerogels of Controlled Density

The method of preparation of aerogels of the subject invention requires the formation of a condensed silica intermediate polysilicate mixture. It is important that all reagents and solvents are highly purified, and particularly that the silicon alkoxide be triple distilled or better. The condensed silica intermediate can be made from any of several compounds, including but not limited to tetraethoxysilane (TEOS) and tetramethoxysilane (TMOS) or like compounds. In particular tetramethoxysilane (TMOS), is partially hydrolysed/condensed by the reactions according to the equations [1] and [2], but with a sub-stoichiometric amount of water, using a selected amount of acid catalyst, including but not limited to HCl, HNO$_3$, H$_2$SO$_4$ and acetic acid, with HCl being preferred, in particular. A sufficient amount of alcohol, including but not limited to ethanol, methanol, butanol, or like alcohol, and in the preferred mode, methanol, is added to aid miscibility of the water and the TMOS. The hydrolysis reaction is controlled by refluxing and results in the formation of a partially hydrolyzed, partially condensed silica intermediate in solution.

There is a maximum limit on high density aerogels which can be made by conventional techniques. From the stoichiometry of the hydrolysis and condensation reactions shown in Equations 1 and 2, the expected bulk density of the silica aerogel would be about 0.27 g/cm$^3$. In conventional practice, aerogels of reduced densities are made by diluting the initial condensed silica solution mixture with alcohol, however this dilution considerably slows the hydrolysis rate and significantly increases the overall time required for gelation. When using such a dilution method to obtain low density aerogels, the gelation of a solution to produce an aerogel of 0.04 g/cm$^3$, would require as much as 14 days to go to completion.

The approximate bulk density (weight per unit volume) of the final aerogel is determined from the initial ratio of the weight of the silica to the volume of the diluent. In the instant invention, condensed silica intermediate is made by an acid catalyzed hydrolysis step. In this invention, a condensed silica intermediate is prepared from which all of the alcohol, both the added solvent and the hydrolysis reaction product alcohol, is removed by distillation. A non-alcoholic solvent, including but not limited to, acetone, ether, acetonitrile and toluene, with acetonitrile especially preferred, is added to inhibit reverse equilibrium reactions and to prevent gelation during storage. Very low density gels are made when hydrolysis of this material is completed with base catalysts, in non-alcoholic solvent. Such low density aerogels are produced in a significantly reduced gelation time.

In the preferred mode, the condensed silica intermediate is initially diluted with an equal weight of the non-alcoholic solvent, acetonitrile. Following the dilution of condensed silica intermediate in acetonitrile solvent, the hydrolysis/condensation step is completed by the regulation of the pH through alteration of the amount of base catalyst. The condensation product is a low density "wet" gel.

The structure of the silica aerogel formed by the base catalyzed process, can be retained if the non-alcoholic solvent is removed directly by supercritical fluid extraction. The solvent and any reaction-generated alcohol may be removed by any of several processes including supercritical extraction, freeze drying, evaporation and the like. Direct supercritical extraction of the solvent in an autoclave is preferred. In the supercritical extraction process, the reaction solvent is removed without causing the large capillary forces which would tend to collapse the gel structures. The "wet" gel is placed in a reaction vessel and subjected to temperature (range of about: 250°-315° C.) and pressure of approximately 2000 psi, which are sufficient to raise the non-alcoholic solvent and any residual alcohol solvent, above their critical points. The supercritical vapor is released from the vessel and the dried aerogel is cooled to room temperature with flowing air.

Alternatively, an inert gas, such as argon or nitrogen, in particular argon may be added to the vessel to provide collateral pressure to achieve the critical pressure of the non-alcoholic solvent. The use of an inert gas limits the additional solvent needed to produce the supercritical pressure conditions. The supercritical extraction of non-alcoholic solvent and residual alcohol solvent or alcohol produced in the instant invention, produces an aerogel with a hydrophobic character.

If the alcohol is directly supercritically extracted as in the previously described procedures, the methyl groups tend to replace the hydrogen on the silica surface by esterification reactions at the conditions of extraction (temperature greater than 250° C., pressure of 1200 psi) and stabilize the gel. However, if the alcohol is exchanged with another non-alcoholic solvent, such as $CO_2$, as previously suggested by Tewari et al., the aerogel produced following such a supercritical extraction of $CO_2$ solvent has a hydrophilic character and will maintain its structure poorly when exposed to humid air.

If it is desired that the gel have a hygroscopic character, then supercritical extraction of a $CO_2$ solvent substitute would produce such a condition.

The low density aerogels which were prepared by the dilution of condensed silica intermediate with non-alcoholic solvent required a short time for the gelling process to occur, on the order of less than 72 hours. This is preferable to the several weeks required for the gelling of aerogels when prepared from alcohol-diluted TMOS gels by prior art methods.

Characterization of the Condensed Silica

The condensed silica was evaluated with $^{29}Si$ NMR and by GC/MS to determine the type and distribution of the polysilicate species. An example of the NMR spectrum of condensed silica product intermediate is shown in FIG. 1. Assignments from the published literature have been used to associate peaks with the denoted structures. The Q notation used to describe the silicic acid and ester structures uses the superscript to refer to the number of silicon atoms bonded to the one under consideration. The schematic representation of the species show the silicon atoms as dots and the oxygens are included in the line coupling the dots. The spectrum shows that the condensation proceeds to the formation of small linear chains and cyclic trimers and tetramers. Only trace amounts of fully linked species are present. Line broadening within the peaks show a wide distribution of molecular weights.

Figure 2:
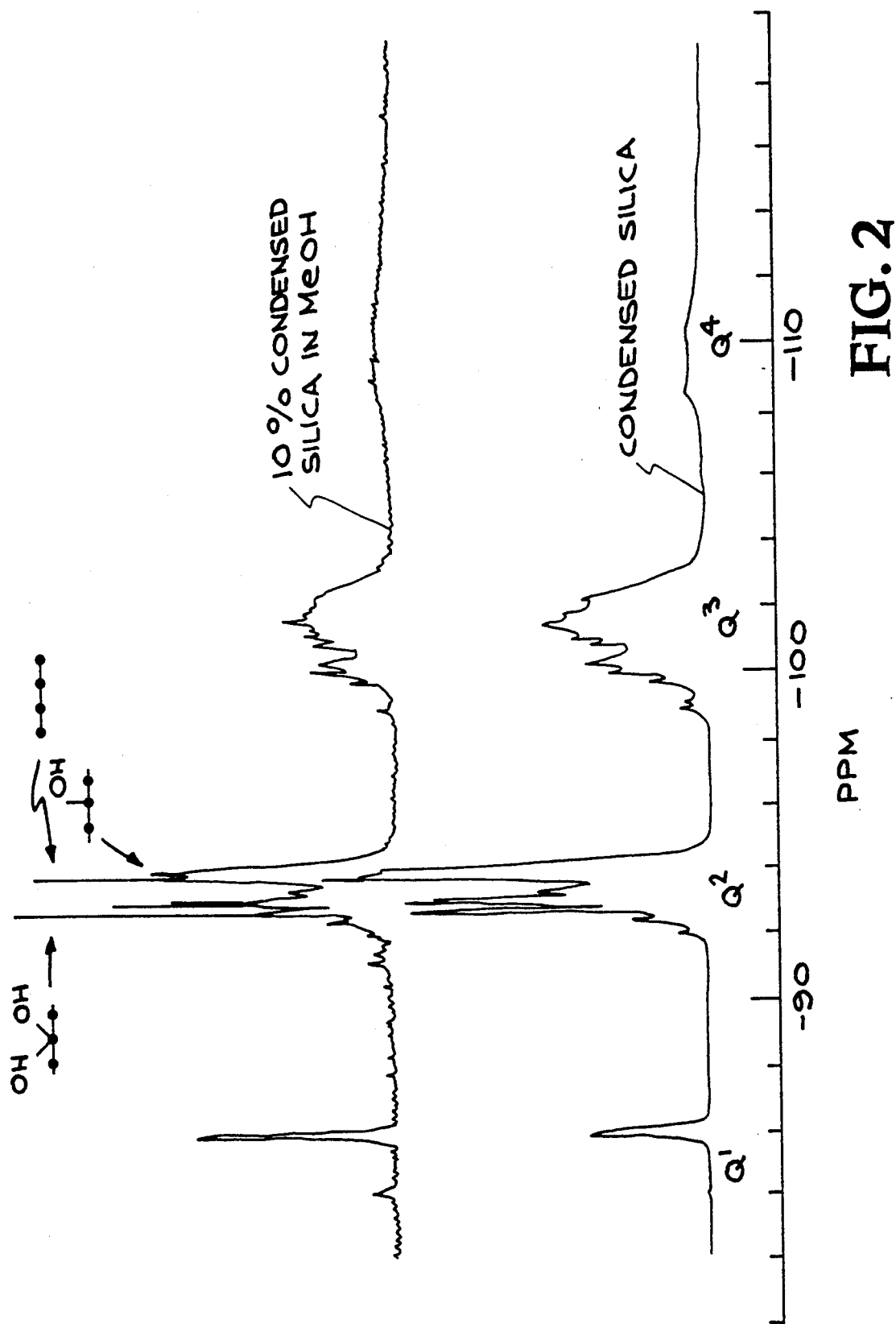
FIG. 2. $^{29}Si$ NMR spectrum of the condensed silica intermediate showing that esterification reactions occur in the methanol/condensed silica intermediate mixture but not the the non-alcohol diluted mixture.

Further $^{29}Si$ analysis demonstrates the re-esterification of the condensed silica (c. s.) in the presence of methanol. FIG. 2 shows that the singular hydroxylated linear species in the condensed silica intermediate decreases with concurrent increase in the quantity of the fully esterified linear species. This process generates water which attacks another similar hydroxylated species, to form a doubly hydroxylated linear species. The cyclic hydroxylated species appear unchanged. Condensed silica intermediate specimens stored in non-alcohol solvents do not show a significant change in this type of analysis.

Figure 3:
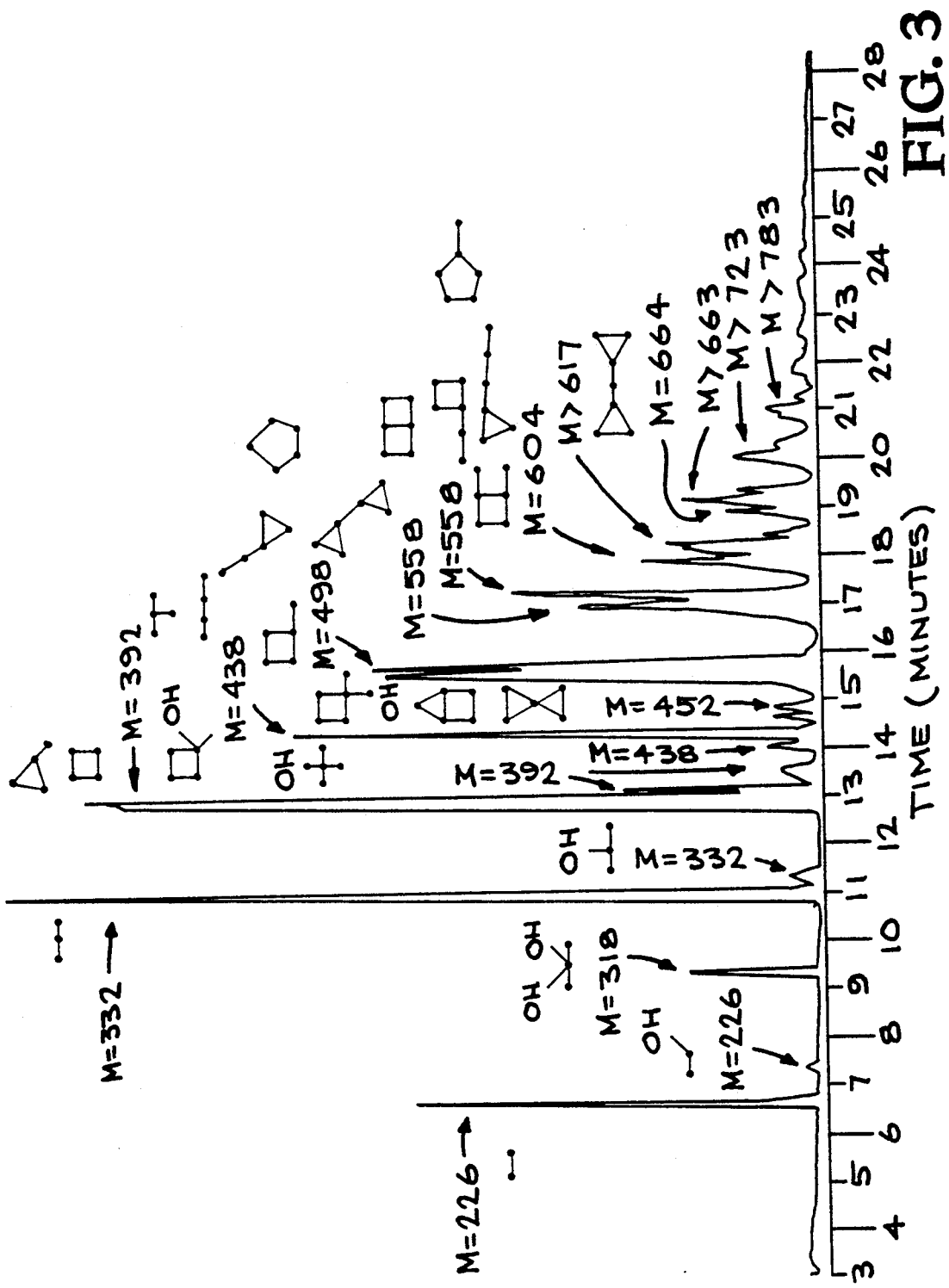
FIG. 3. GC/MS profile of the condensed silica intermediate showing an abundance of cyclic tetramer and cyclic trimer species.

A typical GC/MS profile for the condensed silica intermediate is shown in FIG. 3. The data suggest small linear chains and cyclic trimers and tetramers are formed, in agreement with the NMR results. Determination of the relative peak areas show that the cyclic tetramer and the cyclic trimer, which has one additional siloxane linkage, are the most abundant oligomeric species present in the condensed silica intermediate. The next most abundant species is formed by addition of one siloxane linkage to these oligomers. Further reactions to add more siloxane linkages result in ring closure, to yield a double trimer or tetramer (ladder-like) structures, which are the third most abundant species. Linear species with greater than four siloxane linkages were not detected.

The physical properties of the condensed silica intermediate include: refractive index, (1.406); density, (1.328 gm/cm$^3$); and viscosity, (480 centipoise).

Aerogel Properties

The properties of the low density aerogels made by this method were analysed by conventional laboratory analytical techniques. The hydrophobic aerogels, after high temperature supercritical fluid extraction of the solvents, have a composition which is about 95% $SiO_2$, about 4% C and about 1% H. Some of the hydrogen content (about 0.1%) is due to water molecules adsorbed on the internal surfaces. Hydrophilic aerogels, extracted at low temperature after solvent exchange with liquid carbon dioxide, will typically have a composition of about 99.6% $SiO_2$, about 0.4% by weight of hydrogen and less than 0.06% by weight of carbon.

The organic content of the conventionally produced silica aerogels can be reduced by heat treating, however the aerogel becomes hydrophilic and hygroscopic, as a result of that treatment.

The density of the silica aerogels made by the disclosed invention range from about 0.003 to about 0.8 g/cm$^3$. The refractive index is in the range of 1.0005 to 1.170 when measured at 632.8 nm. The porosity, expressed as the percentage of open space within the total volume, is in the range of 64%–99.9%. The specific surface area of these aerogels is in the range of 450–1000 m$^2$/gm. The Young's modulus is in the range of $4 \times 10^3$ to $2 \times 10^9 N/m^2$. The coefficient of thermal expansion is $2-3 \times 10^{-6}$ cm/cm/°C. over a temperature range from 20° to 80° C. The transmittance is typically greater than 85% at an optical wavelength of 632.8 nm.

Figure 4B:
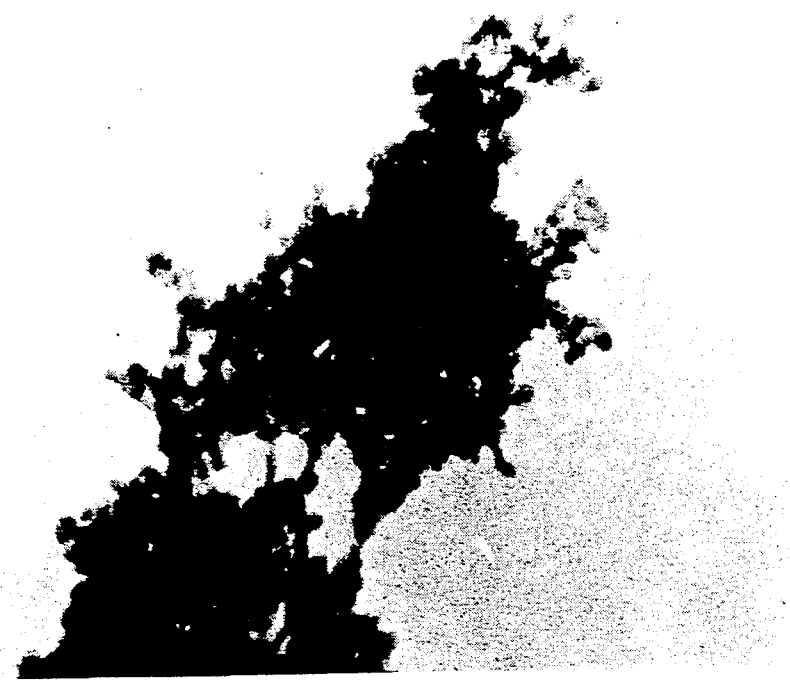
FIGS. 4a and 4b. Transmission Electron Micrographs (TEM) of aerogel of 0.04 g/cm³ density made by the method of the instant invention (FIG. 4a) and an aerogel of the same density made by prior art method (FIG. 4b).
Figure 4A:

The microstructure of the aerogels made by the instant invention differs from the microstructure of aerogels made by conventional methods. The structural differences are demonstrated in FIG. 4 which shows transmission electron micrographs (TEM) for both types of aerogels. The aerogels of 0.04 g/cm$^3$ density made from the condensed silica intermediate of the instant invention (FIG. 4a) shows a chainlike polymeric character whereas the conventionally made aerogel of the same density (FIG. 4b) shows connected spheriodal particles.

Figure 5:
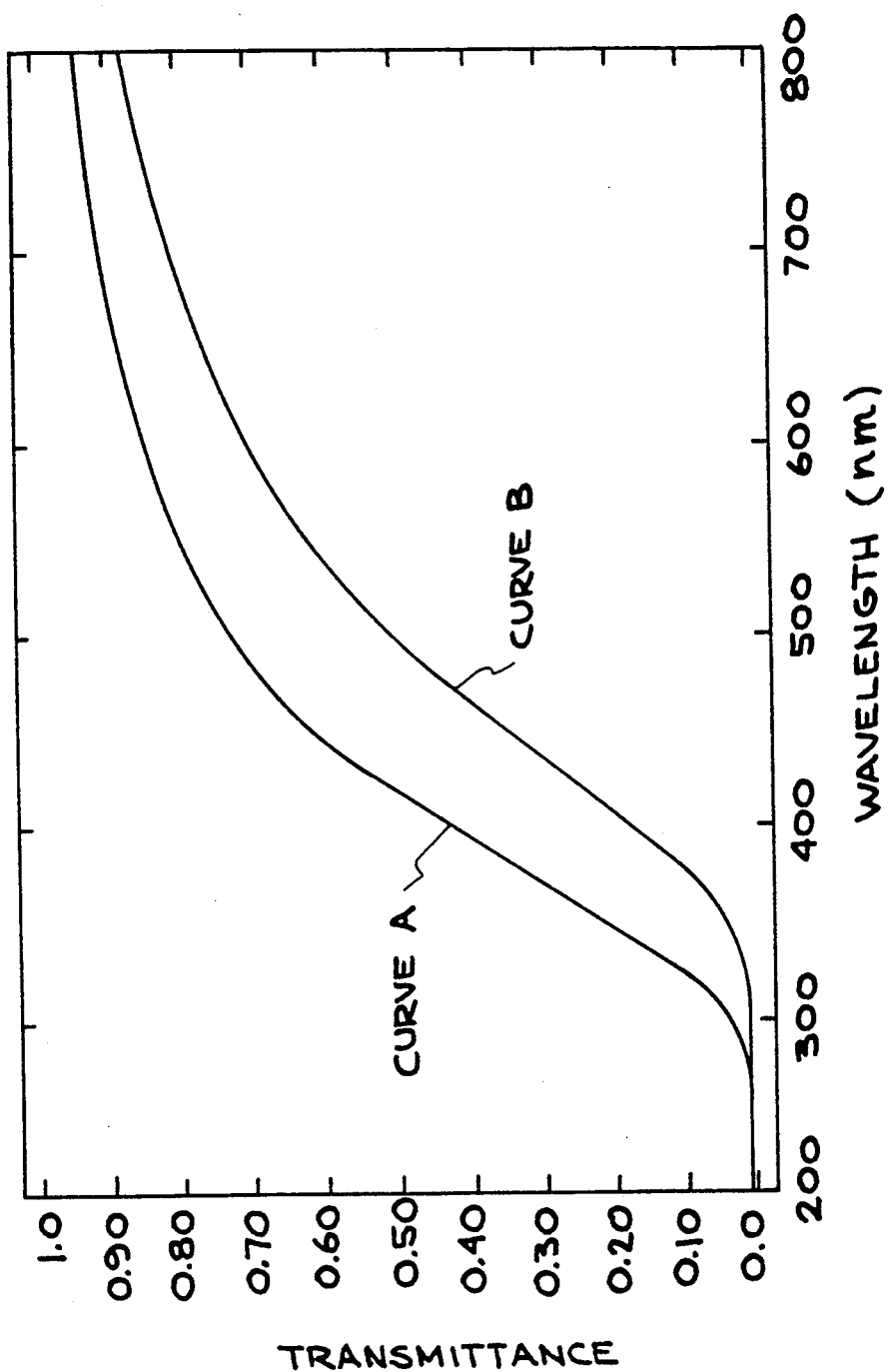
FIG. 5. Light transmission in the the visible and ultraviolet range by samples of aerogels made by the instant method and by prior art methods.
Figure 6:
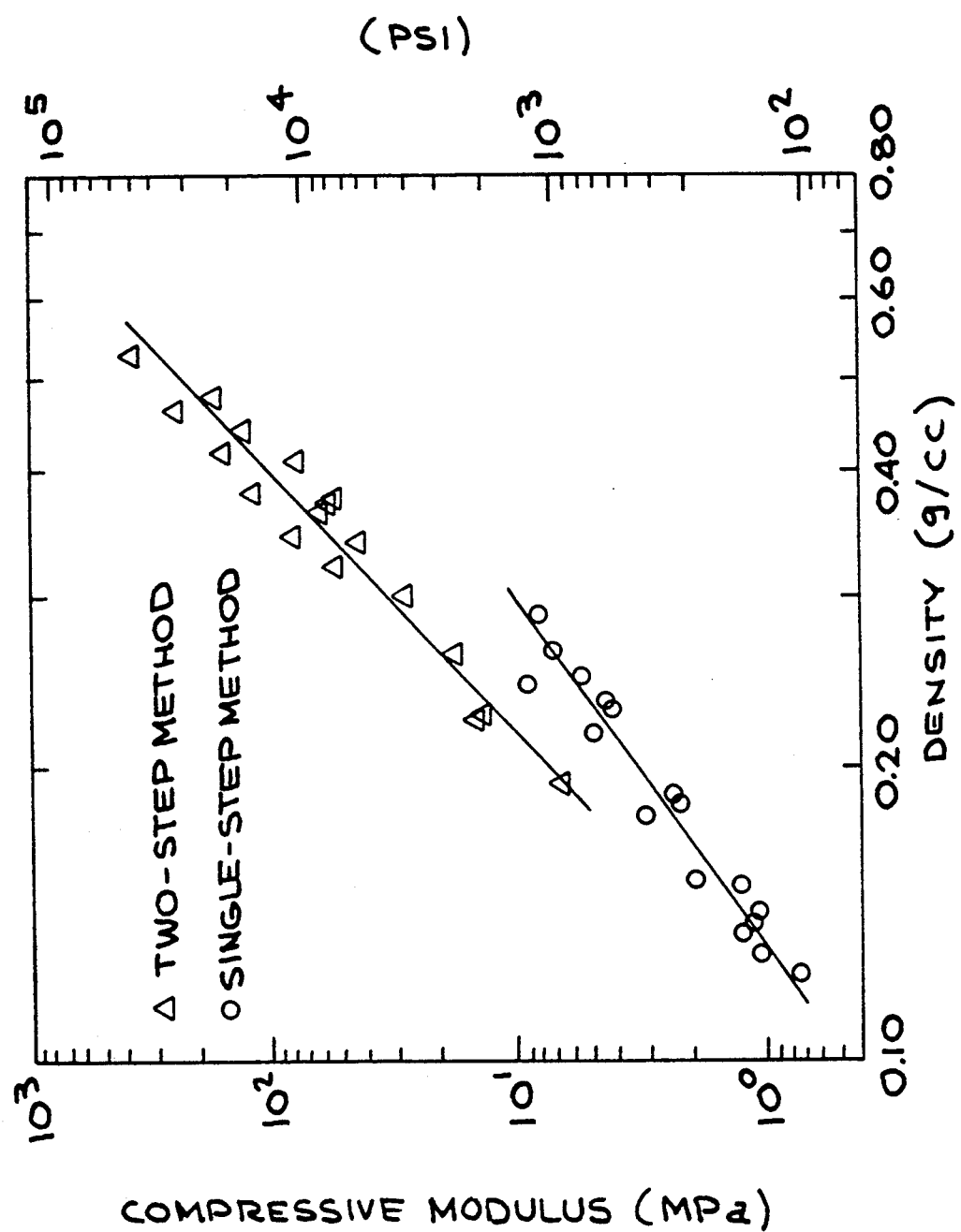
FIG. 6. Compressive modulus for aerogels of comparable densities when made by the instant method and by prior art methods.

The microstructural differences affect other properties of the aerogel, such as transparency and compressive strength. For example, the transmissivity of condensed silica intermediate derived aerogels is typically about 15% higher than for conventionally derived aerogels of the same bulk density, over most of the visible wavelength region. The UV-VIS transmissivity spectrum for a typical set of aerogels is shown in FIG. 5. FIG. 5 shows the transmittance for a monolithic silica aerogel, 2 cm thick and a density of 0.05 g/cm$^3$ (Curve A) made by the method of the instant invention, compared with an aerogel specimen of the same thickness and density (Curve B) made by the conventional single-step method. Also, for example, the compressive modulus of condensed silica intermediate derived aerogels is about three times larger than conventionally derived aerogels, for all densities that we have measured. The compressive modulus is shown for several representative samples of both types of aerogels with aerogels of the instant invention represented by open triangles and aerogels made by conventional process represented by open circles in FIG. 6.

It is known from the theoretical models developed for the thermal conductivity of monolithic silica aerogels (Buttner et al., "Thermal Conductivity in $SiO_2$-Aerogel Tiles," in Aerogels. Springer-Verlag, New York (1986), pp. 104–109) that the solid conductivity of silica aerogel varies with density to the 1.8 power. Thus, aerogels made by the instant invention, which have bulk densities less than 0.02 g/cm$^3$, would be expected to have lower solid thermal conductivity of any aerogel made by conventional methods.

Inorganic impurities may result from the high temperature autoclaving process. A copper impurity, at about 20 ppm, is found in silica aerogels that have been extracted in an autoclave that uses a copper D-ring seal. Other possible contamination can result from the use of thread lubricants with the autoclave. Typically, the aerogels produced contain no impurities above the minimum detectable levels of atomic absorption spectometry.

EXAMPLES

1. Preparation of Condensed Silica Intermediate

It should be recognized that many variations in methods and proportions involving the distilling process can result in a condensed silica intermediate acceptable for the purpose of making silica aerogels. The condensation reaction is performed with highly purified reagents. It is significant that these reagents be free of contaminants.

In the preferred mode, a 200 gram quantity of the silicon alkoxide, tetramethoxysilane (TMOS) (purchased from Dynasil, Inc. and purified by triple distillation) was mixed with 100 grams of methanol and 30 grams of water (A representative example of the molar ratios required was about 1 TMOS:2.4 MeOH:1.3 $H_2O$). The reagents were mixed and reacted in a refluxing apparatus, under acidic conditions (400 ul of HCl is added) for period of about 16 hours. The amount of water used was about 65% of that which was needed to form $SiO_2$ by the hydrolysis/condensation reactions of equations [1] and [2]. All of the alcohol, methanol, including that which is generated by the reactions, was removed by distillation at 67°–70° C. temperature in 2–3 hours. About 253 ml of distillate was removed during this step. The bath temperature was maintained at 100° C. during the distillation.

The condensed silica intermediate remaining in the refluxing apparatus was then diluted with an equal weight of non-alcoholic solvent, such as acetonitrile. The non-alcoholic solvent inhibits the back reaction to the silicon alkoxide and permits the condensed silica intermediate to be stored for future use.

2. Preparation of Gels from Condensed Silica Intermediate

The condensed silica intermediate, diluted by an equal weight of acetonitrile, is mixed with an additional quantity of acetonitrile, some water, and a basic catalyst ($NH_4OH$). The targeted density for the gel is used to determine the relative ratios of each constituent in the mixture according to the following relation:

Target density $\simeq$ Weight of silica in condensed silica intermediate/total volume of diluent For purposes of this calculation, the weight of silica in the condensed silica intermediate is determined from the molar fraction of the original TMOS, with the assumption that there is no loss of silica during the distillation.

As an example, for preparation of an aerogel with a target density of 0.01 g/cm$^3$, the following relationship is considered:

Vol. of acetonitrile to be added = 20 g
(condensed silica-intermediate + acetonitrile $\times$ 0.197/0.01 g/cm$^3$ Therefore, the acetonitrile to be added is about 395 cm$^3$ or 310 g. In the above equation, the term 0.197 is $\frac{1}{2}$ of the ratio of the molecular weights of $SiO_2$ to TMOS.

The quantity of water added is 2.7 times the molar equivalent of the original amount of TMOS. For the above example:

Wt. of added water = 2.7 $\times$ 0.07 mol $\times$ 18 g/mole
= 3.2 g.

The quantity of concentrated $NH_4OH$ (1N) added was 2 ml per liter of condensed silica product solution. All of the constituents were mixed together in a common container and stirred for 30 minutes, at room temperature. The solution was poured into molds, which may be of glass, metal or ceramic construction, and gelation typically occured within 72 hours, at room temperature. All solvent was removed by direct supercritical fluid extraction at a temperature of 300° C.

3. Extraction of Solvent from the Wet Gels

Two methods were used to extract non-alcoholic solvent and any reaction-generated alcohol from the wet gels. One method is the direct supercritical extraction of the solvent and the other method first requires the exchange of non-alcoholic solvent by another solvent.

In the first of the two methods, the mold with the wet gel sample was placed directly into a pressure vessel which is capable of withstanding temperatures as high as 320° C. and pressures as high as 3000 psi. For a pressure vessel with a volume of 3 liters, about 0.5 liters of acetonitrile, was poured into the vessel prior to sealing. The vessel was then pressurized to 1500 psi, with argon gas, or other inert gas, such as $N_2$. Heat was applied to the raise the vessel temperature linearly at a rate of 0.3° C. per minute, to an intermediate temperature of 210° C., and then at a rate of 0.2° C. per minute to a maximum temperature of 300° C. This is above the critical point for acetonitrile, which is at a temperature of 295° C. and a pressure of 780 psi. The pressure rises and was maintained at 2000 psi during the heat ramp, by means of a pressure relief valve. The vessel pressure was maintained at 2000 psi while the final temperature was held for 30 minutes and then the pressure is slowly released at a linear rate of 5 psi per minute. The heaters were turned off and the vessel was allowed to cool to ambient temperature once the vessel had reached atmospheric pressure. The vessel was purged with dried nitrogen gas during the cooling period.

An alternate method for extraction of the non-alcoholic solvent involves solvent exchange using $CO_2$. The mold containing the wet gel was placed in the pressure vessel, sealed, and pre-cooled to 15° C. and pressurized to 800 psi. Liquified carbon dioxide was transferred into the pressure vessel and a series of soaks and flushes are performed over 3 to 4 days. This flushing removed all of the internal solvent and replaced it with liquid carbon dioxide. Subsequently, the pressure vessel is heated at a rate of about 0.5° C. per minute to a temperature of 45° C., and the pressure is regulated to 1600 psi. (The critical point for carbon dioxide is T=34° C. and P=1180 psi.) After 30 minutes, the internal pressure of the vessel was relieved at a rate of about 0.5 psi per minute, until atmospheric pressure was attained. The aerogel was removed from the pressure vessel under a continuous flow of inert gas and was immediately placed in a dessicated environment.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A two-step reaction method for making aerogels of a density less than 0.02 g/cm³, comprising:
   a. mixing a metal alkoxide with a sub-stoichiometric amount of water and an alcohol solvent;
   b. reacting the metal alkoxide solution with an acid catalyst to produce an oligometric mixture of partially condensed metal oxide intermediate and reaction-generated alcohol;
   c. removing all reaction-generated and solvent alcohol;
   d. adding a non-alcoholic solvent to the partially condensed metal oxide intermediate;
   e. reacting said non-alcoholic solvated condensed metal oxide intermediate with water and a base catalyst to complete the hydrolysis;
   f. pouring the base-catalyzed condensed metal oxide product into a mold to form a gel; and
   g. extracting said non-alcoholic solvent from the gel to form an aerogel.

2. A method as in claim 1 wherein said metal alkoxide is silicon alkoxide.

3. A method as in claim 2 wherein said silicon alkoxide is selected from the group consisting of tetramethoxysilane, tetraethoxysilane, tetrapropoxysilane and tetrabutoxysilane.

4. A method as in claim 1 wherein the said acid catalyst is selected from the group consisting of HCl, $HNO_3$, $H_2SO_4$ and acetic acid.

5. A method as in claim 1 wherein in step c said alcohol is removed by a method selected from the group consisting of distillation and evaporation.

6. A method as in claim 1 wherein said non-alcoholic solvent is selected from the group consisting of acetonitrile, acetone, ether and toluene.

7. A method as in claim 6 wherein said non-alcoholic solvent is acetonitrile.

8. A method as in claim 1 wherein said base catalyst is selected from the group consisting of $NH_4OH$, NaOH, KOH and gaseous ammonia.

9. A method as in claim 1 wherein said non-alcoholic solvent is removed by a method selected from the group consisting of supercritical fluid extraction, freeze drying and evaporation.

10. A method as in claim 9 wherein said non-alcoholic solvent is removed by a method of supercritical fluid extraction.

11. A method as in claim 6 wherein said non-alcoholic solvent is exchanged for another non-alcoholic solvent prior to extracting step.

12. A method as in claim 9 wherein an inert gas provides the pressure during supercritical extraction of said solvent.

13. A two-step reaction method for making silica aerogels of a density less than 0.02 g/cm³, comprising:
   a. mixing a silicon alkoxide with a sub-stoichiometric amount of water and an alcohol solvent;
   b. reacting the silicon alkoxide solution with an amount of acid catalyst to produce an oligometric mixture of partially condensed silicon oxide intermediate and reaction-generated alcohol;
   c. removing all reaction-generated and solvent alcohol;
   d. adding a non-alcoholic solvent to the partially condensed silicon oxide intermediate;
   e. reacting the non-alcoholic solvated condensed silicon oxide intermediate with a base catalyst and water to complete the hydrolysis and form a condensed silicon oxide product;
   f. pouring the base-catalyzed condensed silicon oxide product into a mold to form a gel; and
   g. extracting the non-alcoholic solvent from the gel to form an aerogel.

14. A two-step reaction method for making metal oxide aerogels of a density less than 0.02 g/cm³, comprising:
   a. mixing a metal alkoxide with a sub-stoichiometric amount of water and an alcohol solvent, wherein the metal alkoxide is an alkoxide of a metal selected from the group consisting of silicon, germanium, tantalum, zirconium, boron, titanium, and aluminum;
   b. reacting the metal alkoxide solution with an amount of acid catalyst to produce an oligometric mixture of partially condensed metal oxide intermediate; and reaction-generated alcohol;
   c. removing all reaction-generated and solvent alcohol;
   d. adding a non-alcoholic solvent to the partially condensed metal oxide intermediate;
   e. reacting the non-alcoholic solvated condensed metal oxide intermediate with a base catalyst and water to complete the hydrolysis and form a condensed metal oxide product;
   f. pouring the base-catalyzed condensed metal oxide product into a mold to form a gel; and
   g. extracting the non-alcoholic solvent from the gel to form an aerogel.

* * * * *